US008616022B2

(12) United States Patent
Kim et al.

(10) Patent No.: US 8,616,022 B2
(45) Date of Patent: Dec. 31, 2013

(54) APPARATUS AND METHOD FOR MANUFACTURING FLOAT GLASS

(75) Inventors: Woo-Hyun Kim, Dongducheon-si (KR); Sang-Oeb Na, Seoul (KR); Won-Jae Moon, Seoul (KR); Jeong-Deok Kim, Seoul (KR); Kil-Ho Kim, Suwon-si (KR); Heui-Joon Park, Paju-si (KR); Jin Han, Goyang-si (KR); Dong-Shin Shin, Incheon (KR)

(73) Assignee: LG Chem, Ltd., Seoul (KR)

( * ) Notice: Subject to any disclaimer, the term of this patent is extended or adjusted under 35 U.S.C. 154(b) by 209 days.

(21) Appl. No.: 13/149,241

(22) Filed: May 31, 2011

(65) Prior Publication Data

US 2011/0294647 A1    Dec. 1, 2011

(30) Foreign Application Priority Data

Jun. 1, 2010   (KR) ................... 10-2010-0051986

(51) Int. Cl.
   *C03B 18/16*    (2006.01)
(52) U.S. Cl.
   USPC ............ 65/99.4; 65/99.2; 65/182.3; 65/135.6
(58) Field of Classification Search
   USPC ........ 65/99.4, 182.3, 99.2, 135.6; 373/52, 55, 373/37, 127, 128, 133
   See application file for complete search history.

(56) References Cited

U.S. PATENT DOCUMENTS

| | | | | |
|---|---|---|---|---|
| 3,817,735 A * | 6/1974 | Jones | | 65/99.3 |
| 3,926,605 A * | 12/1975 | Kunkle | | 65/91 |
| 4,081,261 A * | 3/1978 | Tilton | | 65/99.3 |
| 4,236,906 A * | 12/1980 | Hummel | | 65/27 |
| 4,287,380 A * | 9/1981 | Fairbanks et al. | | 373/36 |
| 4,322,236 A * | 3/1982 | Sensi | | 65/182.5 |
| 4,340,410 A * | 7/1982 | May | | 65/182.3 |
| 4,340,411 A * | 7/1982 | May | | 65/182.3 |
| 4,340,412 A * | 7/1982 | May | | 65/182.5 |
| 4,445,924 A * | 5/1984 | May et al. | | 65/182.3 |
| 5,151,918 A * | 9/1992 | Argent et al. | | 373/27 |
| 5,427,598 A * | 6/1995 | Gessler et al. | | 65/182.1 |
| 5,562,749 A * | 10/1996 | Gessler et al. | | 65/99.2 |
| 5,600,669 A * | 2/1997 | Pieper | | 373/38 |
| 6,334,337 B1 * | 1/2002 | Macedo et al. | | 65/134.5 |
| 2005/0286604 A1 * | 12/2005 | Rott | | 373/93 |
| 2005/0286605 A1 * | 12/2005 | Rott | | 373/93 |
| 2006/0288736 A1 * | 12/2006 | Kamihori et al. | | 65/99.2 |
| 2008/0028795 A1 * | 2/2008 | Kamihori et al. | | 65/136.2 |

FOREIGN PATENT DOCUMENTS

DE           10132729 A1 *   1/2003

OTHER PUBLICATIONS

DE10132729—English Language Translation accessed via ESP@CENET on May 20, 2013.*

* cited by examiner

*Primary Examiner* — Jason L Lazorcik
(74) *Attorney, Agent, or Firm* — McKenna, Long & Aldridge, LLP

(57) ABSTRACT

An apparatus for manufacturing a float glass includes a bottom block in which molten metal is stored and floats, a loop block which covers the bottom block and has at least one hole formed therethrough, a heater installed through the hole, and a fragment intercepting member for preventing fragments generated at the loop block from falling onto the bottom block through the hole.

3 Claims, 7 Drawing Sheets

APPARATUS AND METHOD FOR MANUFACTURING FLOAT GLASS

CROSS-REFERENCE TO RELATED APPLICATION

This application claims priority under 35 U.S.C. §119(a) to Korean Patent Application No. 10-2010-0051986 filed at the Korean Intellectual Property Office on Jun. 1, 2010, the entire contents of which are incorporated herein by reference.

BACKGROUND

1. Field

Exemplary embodiments relate to an apparatus and method for manufacturing a float glass, and more particularly, to an apparatus and method for manufacturing a float glass, which has an improved structure so that fragments generated from a loop block of a float chamber may be intercepted.

2. Description of the Related Art

Generally, flat glasses used in the industries such as window panes (e.g., soda lime silica glasses) of vehicles or buildings are mostly produced using a floating process well known in the art. In addition, thin glass panes or glass films (e.g., non-alkali glasses) for TFT displays or the like are also a kind of "float glass" produced using a floating process.

FIG. 1 is a vertical sectional view schematically showing a general float glass manufacturing system, and FIG. 2 is a cross-sectional view of the system of FIG. 1.

Referring to FIGS. 1 and 2, a general float glass manufacturing system 2 includes a float chamber 1 for sealing reducing hydrogen ($H_2$) and/or nitrogen ($N_2$) gas to be fully filled therein so as to prevent molten metal M from being oxidized. In other words, the float chamber 1 includes a bottom block 6, a loop block 7 positioned above the bottom block 6, and a side seal 8 installed between the bottom block 6 and the loop block 7.

Meanwhile, the loop block 7 is divided into an upper space 3a and a lower space 3b by a brick layer 3. The brick layer 3 has a plurality of holes 4 formed therethrough. In addition, a heater 9 is installed to the hole 4. The heater 9 keeps the inside of the float chamber 1 at a predetermined temperature.

FIG. 3 is a sectional view schematically showing the heater of FIGS. 1 and 2.

Referring to FIG. 3, the hole 4 formed in the brick layer 3 of the loop block 7 has a diameter greater than an outer diameter of the heater 9. Therefore, when the heater 9 is inserted into the hole 4, a predetermined gap g is created between the outer peripheral surface of the heater 9 and the inner peripheral surface of the hole 4.

Here, the brick layer 3 is a combination of plural bricks. For this reason, brick fragments may be generated around the hole 4, and the generated brick fragments may fall down onto a glass ribbon GR. In this case, the brick fragments may give bad effects on the quality of a flat glass produced. Therefore, it is necessary to prevent the brick fragments from moving into the float chamber.

SUMMARY

The exemplary embodiments are designed to solve the problems of the prior art, and therefore the exemplary embodiments are directed to providing an apparatus and method for manufacturing a float glass with an improved structure which may intercept brick fragments generated from refractory material of a brick layer of a loop block not to move into a float chamber through a hole in which a heater is installed.

In one aspect, the exemplary embodiment provides an apparatus for manufacturing a float glass, which includes: a bottom block in which molten metal is stored and floats; a loop block which covers the bottom block and has at least one hole formed therethrough; a heater installed through the hole; and a fragment intercepting member for preventing fragments generated at the loop block from falling onto the bottom block through the hole.

Preferably, the fragment intercepting member has a sleeve interposed between the hole and the heater.

Preferably, the sleeve includes a sleeve body inserted into the hole to contact an inner surface of the hole; and a protrusion formed to protrude on the sleeve body so that it hooks by one surface of the loop block.

Preferably, the sleeve has a tube made of refractory material.

Preferably, the refractory material is an alumina-based or silica-based material.

Preferably, the fragment intercepting member includes a packing installed to a lower surface of the loop block to stop the hole by surrounding the heater.

Preferably, the packing is made of refractory material.

Preferably, the refractory material is an alumina-based or silica-based material.

In another aspect, the exemplary embodiment provides a method for manufacturing a float glass, which includes: continuously supplying molten glass onto the molten metal from an inlet of a float chamber of the apparatus for manufacturing a float glass; forming the molten glass into a glass ribbon on the molten metal; and continuously drawing the glass ribbon from an outlet of the float chamber.

The apparatus and method for manufacturing a float glass according to exemplary embodiments use a fragment intercepting member such as a sleeve or packing in cases where a heater is installed in a hole of a brick layer of a loop block, so that refractory fragments do not fall down onto a glass ribbon from the ceiling of the loop block when a float glass is formed. Therefore, the apparatus and method may fundamentally prevent the refractory fragments from giving bad effects on the quality of the produced float glass.

BRIEF DESCRIPTION OF THE DRAWINGS

Other objects and aspects of the present invention will become apparent from the following descriptions of the embodiments with reference to the accompanying drawings in which.

DESCRIPTION OF THE PREFERRED EMBODIMENT

Hereinafter, an apparatus and method for manufacturing a float glass according to exemplary embodiments will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
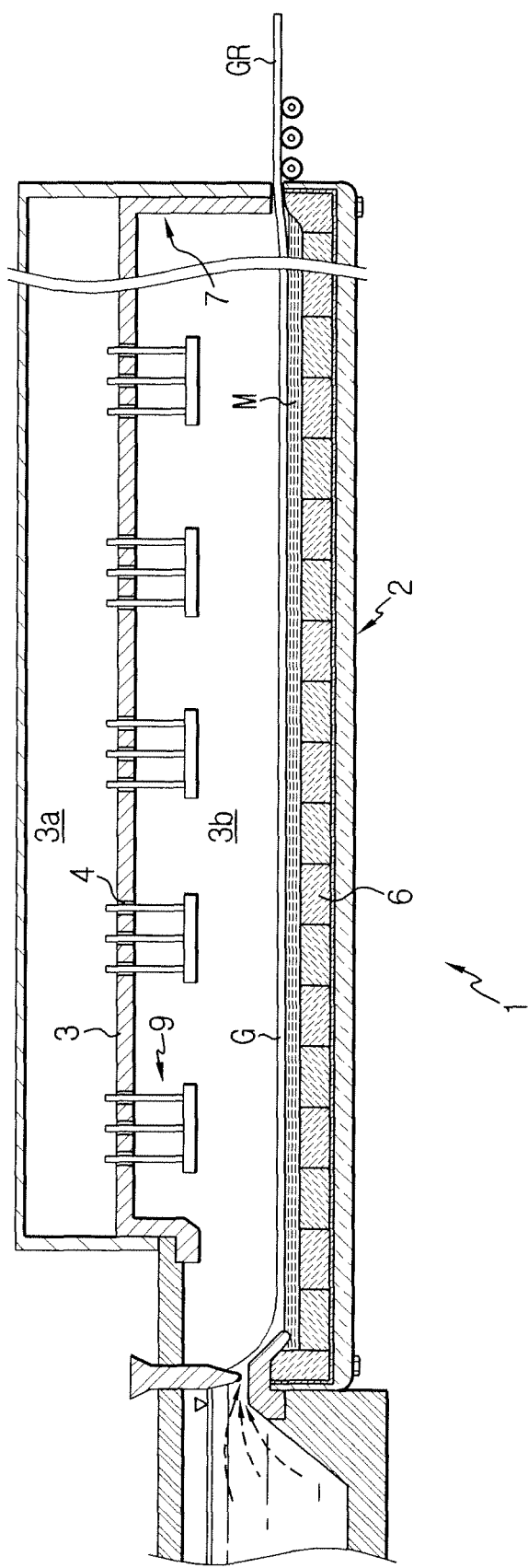
FIG. 1 is a vertical sectional view schematically showing a general float glass manufacturing system.
Figure 2:
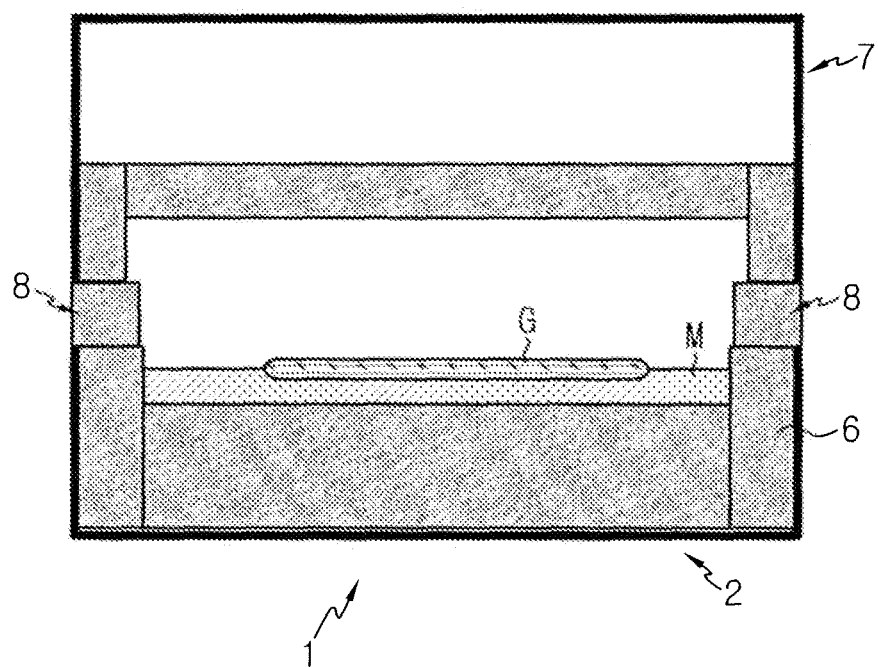
FIG. 2 is a cross-sectional view showing the system of FIG. 1.
Figure 3:
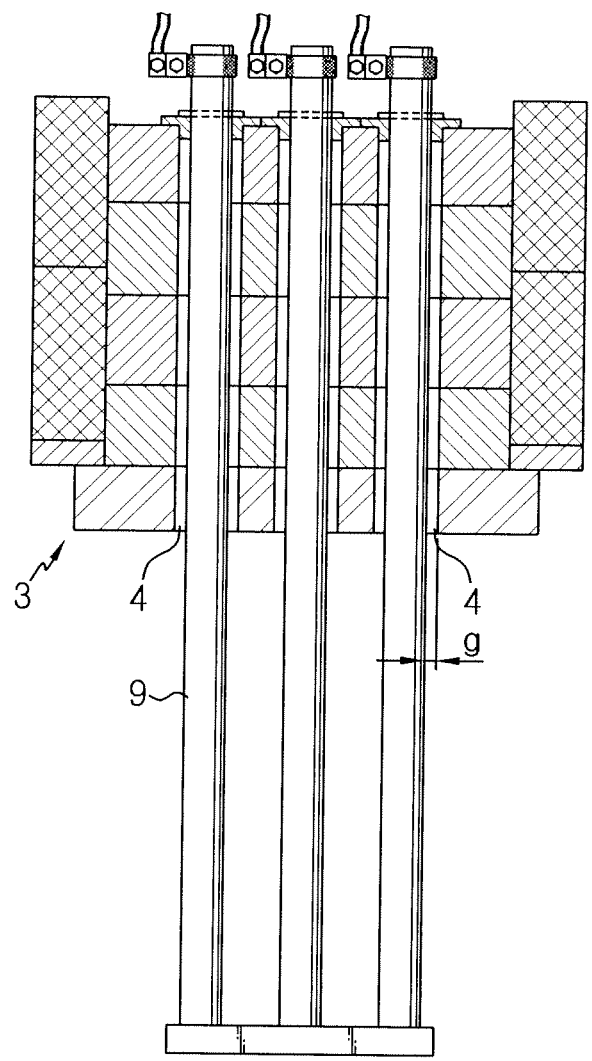
FIG. 3 is a sectional view schematically showing a heater of FIGS. 1 and 2.
Figure 4:
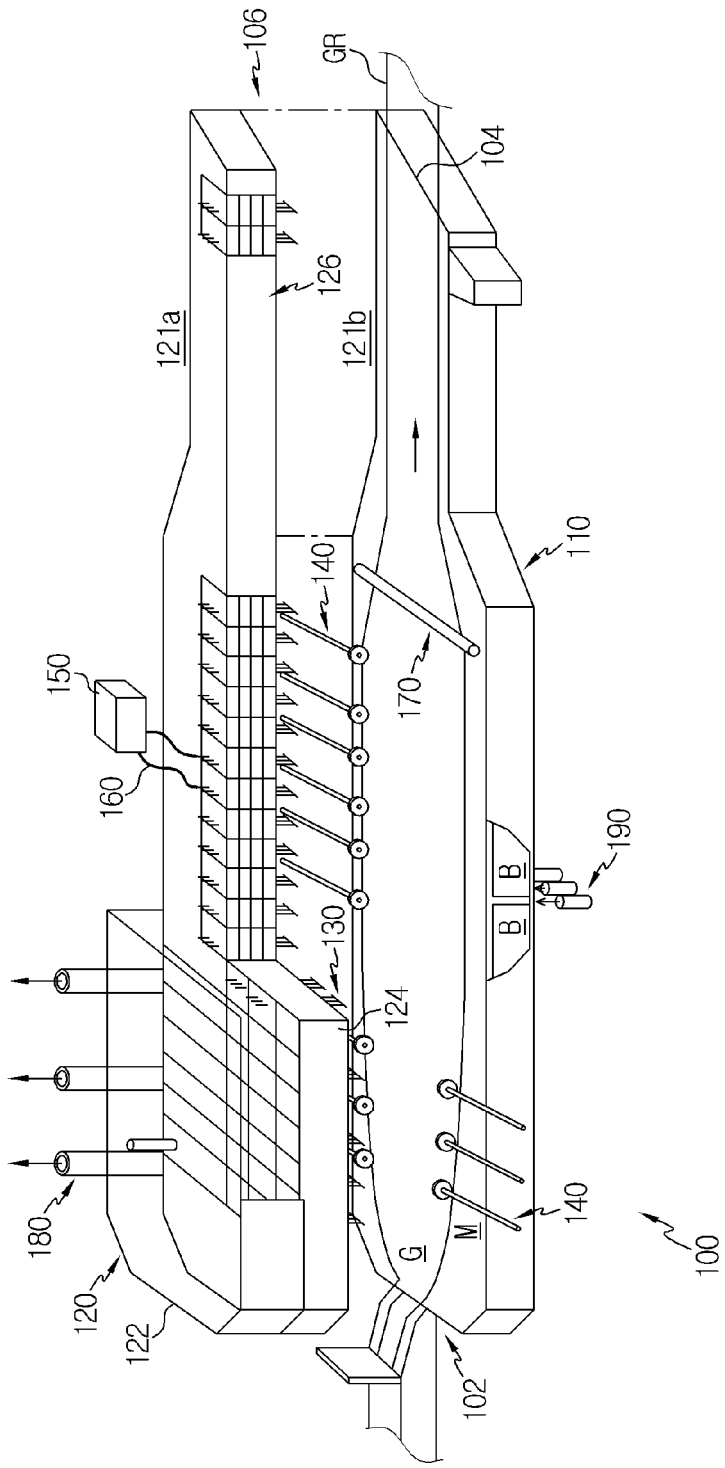
FIG. 4 is an exploded perspective view schematically showing an apparatus for manufacturing a float glass according to an exemplary embodiment.
Figure 5:
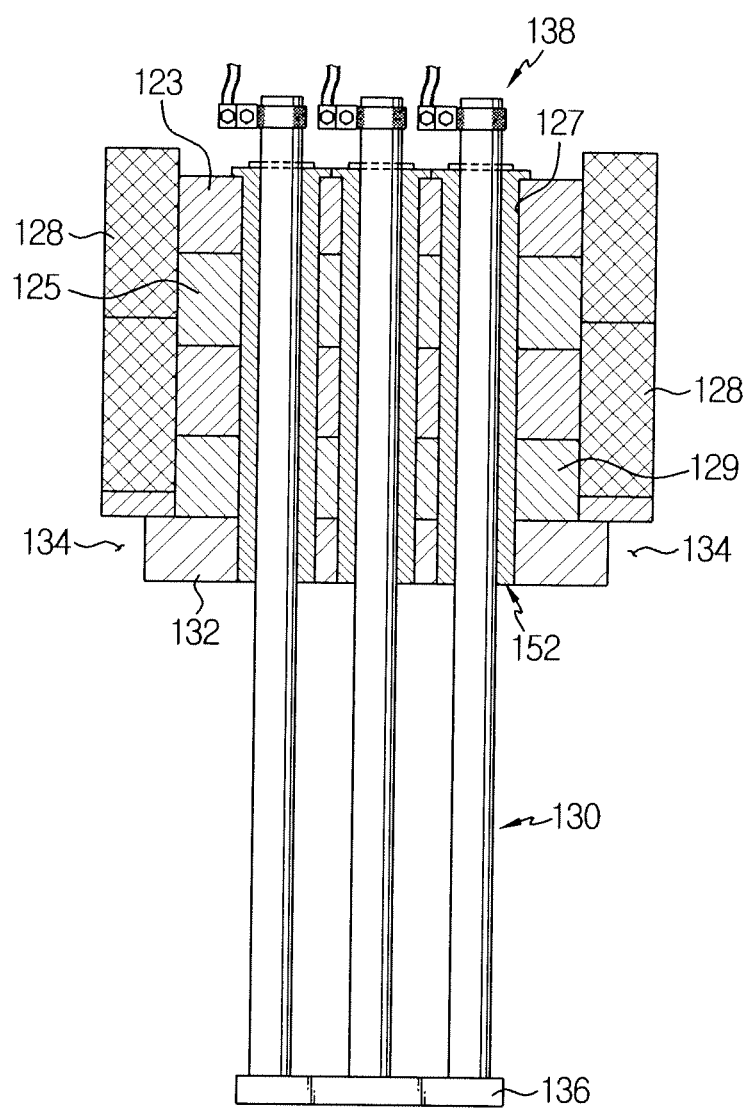
FIG. 5 is a sectional view showing a brick module of FIG. 4.
Figure 6:
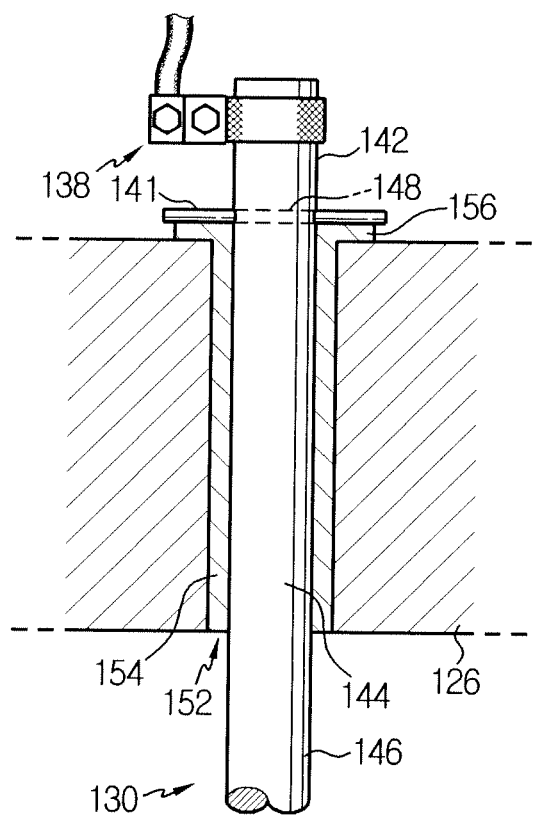
FIG. 6 is a sectional view showing a heater of FIG. 5.

FIG. 4 is an exploded perspective view schematically showing an apparatus for manufacturing a float glass according to an exemplary embodiment, FIG. 5 is a sectional view showing a brick module of FIG. 4, and FIG. 6 is a sectional view showing a heater of FIG. 5.

Referring to FIGS. 4 to 6, an apparatus 100 for manufacturing a float glass according to this embodiment includes a bottom block 110 in which molten metal M is filled and floats, a loop block 120 positioned above the bottom block 110 to cover the bottom block 110, and a side seal (not shown) interposed between the loop block 120 and the bottom block 110.

The bottom block 110, the loop block 120 and the side seal configure a sealed float chamber 106 with an inlet 102 and an outlet 104 as a whole. The inside of the float chamber is filled with a mixed gas of nitrogen and hydrogen. The mixed gas is kept at a pressure slightly higher than the atmospheric pressure. The molten metal M and ribbon-shaped molten glass G are kept at about 600 to 1,300° C. by a heater 130. The molten glass G is a non-alkali glass, a soda lime glass or the like. The principle or structure of generating a flow of the molten metal M in the float chamber 106 and the process of putting, forming into a ribbon shape, moving or discharging the molten glass G are already well known in the art as a floating process, and are not described in detail here. Reference numeral 140 represents a top-roller for forming the molten glass G. Reference numeral 150 represents a transformer for supplying and/or controlling power to the heater 130. Reference numeral 160 represents a bus bar which electrically connects the transformer 150 to the heater 130. Reference numeral 170 represents a tin barrier for controlling a floating direction of the molten metal M. Reference numeral 180 represents a venting system for discharging the gas in the float chamber 106 to the outside. Reference numeral 190 represents a cooling member for cooling the bottom block 110.

The bottom block 110 is composed of plural bricks B arranged in a length direction of the float chamber 106 so that molten metal M such as molten tin, molten tin alloy or the like may be stored thereon. The bricks B are surrounded by a metal casing (not shown).

The side seals are located at the upper surface of the bottom block 110 and the lower surface of the loop block 120 to seal the float chamber 106 by substantially isolating the inside of the float chamber 106 from the outside. The side seals are a plurality of structures with a substantially hexahedral shape, which are arranged in a length direction of the float chamber 106.

The loop block 120 includes a steel loop casing 122 which hangs from an upper structure (not shown) such as a cross-beam in a building to which the apparatus 100 is installed, and a side block 124 which is made of lining heat-retaining bricks and disposed in a lower space of the loop casing 122. The inner space of the loop block 120 is divided into an upper space 121a and a lower space 121b by a loop brick layer 126.

As shown in FIG. 5, the loop brick layer 126 has a module structure in which a plurality of bricks are combined, and each brick module is made of various kinds of refractory materials. In other words, the loop brick layer 126 includes a plurality of support tiles (not shown) made of sillimanite and rail tiles 128 arranged orthogonal to the support tiles, which form a lattice framework, and a brick module called PBA having a substantially rectangular shape is loaded on the lattice framework. The support tile hangs from the ceiling portion of the loop casing 122 of the loop block 120 by a hanger (not shown). In other words, the loop brick layer 126 is kept horizontally at a predetermined height above the molten metal M by the hanger. The side of the loop brick layer 126 contacts the upper portion of the side of the side block 124, and the upper surface of the loop brick layer 126 is disposed at substantially the same height as the upper surface of the side block 124. A hole 127 is formed in the loop brick layer 126 so that the heater 130 is installed through the hole 127.

For example, a brick module such as PBA30 is obtained by piling up and fastening an insulating ceramic plate 123, a low-temperature heat-retaining brick 125, a high-temperature heat-retaining brick 129 and a sillimanite brick 132. Placing portions 134 are formed at both sides of the sillimanite brick 132 so as to be placed on the support tile. The hole 127 through which the heater 130 is installed is formed through the brick module. The loop brick layer 126 has a thickness of about 292 mm.

The heater 130 is generally made of SiC material. In addition, ends of three heaters 130 are connected by a connection member 136 to configure a single assembly. The heater 130 includes an electricity supply portion 142 protruding above the loop brick layer 126 so that a strap 138 is installed thereto, a non-heating portion 144 located in the hole 127 of the loop brick layer 126, and a heating portion 146 protruding into the lower space 121b. The heater 130 also has an installation hole 148 formed substantially at a border between the electricity supply portion 142 and the heating portion 146 so that an installation pin 141 is inserted into the installation hole 148. The installation pin 141 allows the heater 130 to hang from the loop brick layer 126.

The float chamber 106 according to the exemplary embodiment includes a fragment intercepting member for preventing fragments generated around the hole 127 of the loop brick layer 126 of the loop block 120 from falling onto the bottom block 110 through the hole 127.

The fragment intercepting member includes a sleeve 152 interposed between the hole 127 and the heater 130. The sleeve 152 includes a sleeve body 154 inserted into the hole 127 to contact the inner surface of the hole 127, and a protrusion 156 protruding on the sleeve body 154 to be hooked by the upper surface of the loop block 120. The sleeve 152 is made of for example alumina-based or silica-based refractory material and has a tube structure which is flexible to some extent.

Figure 7:
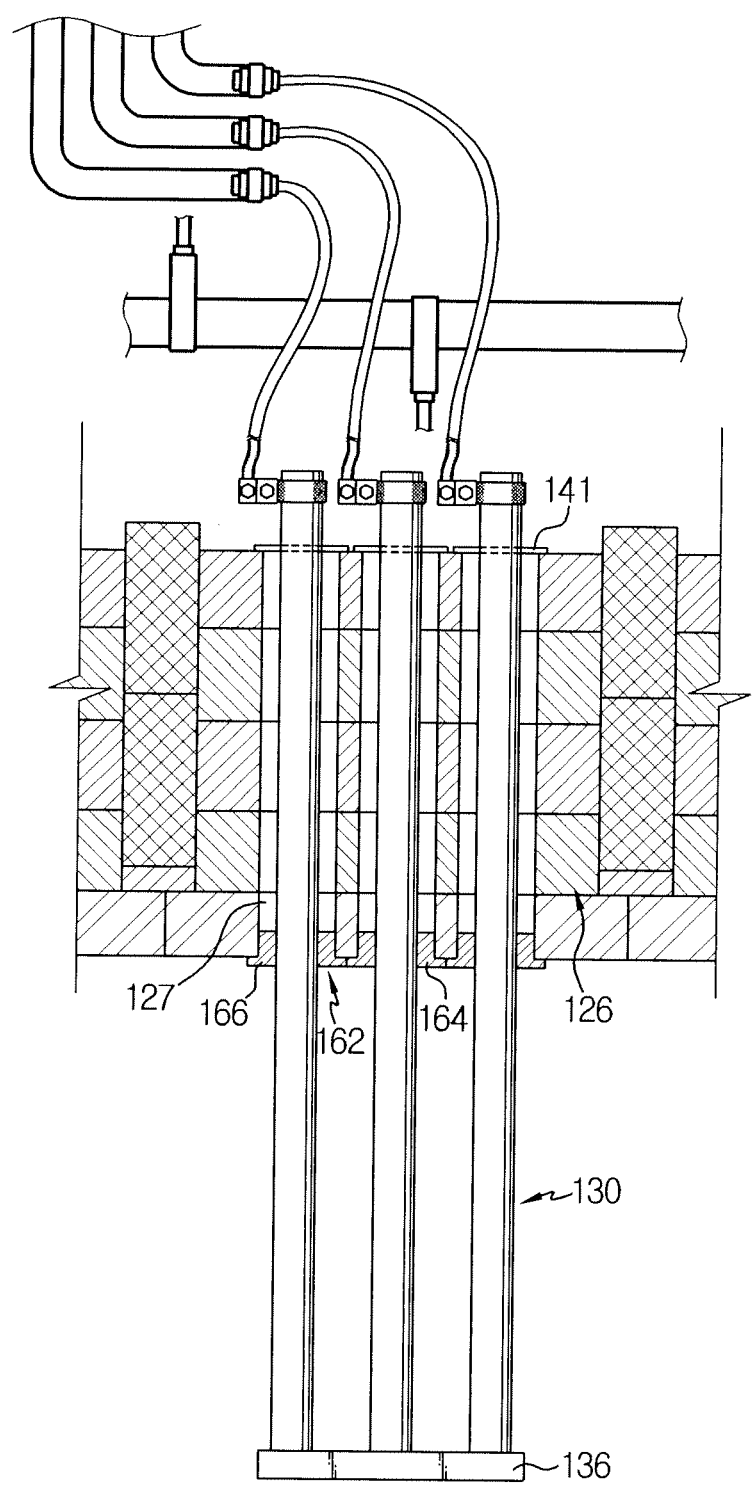
FIG. 7 is a sectional view of a brick layer showing a fragment intercepting member according to another exemplary embodiment.

FIG. 7 is a sectional view of a brick layer showing a fragment intercepting member according to another exemplary embodiment. The component designated by the same reference numeral as in FIGS. 4 to 6 has the same function.

Referring to FIG. 7, the fragment intercepting member of this embodiment includes a packing 162 installed to the lower surface of the loop block 120 so that the packing 162 is fitted into the hole 127 while surrounding the heater 130. Similar to the sleeve 152 of the former embodiment, the packing 162 is made of alumina-based or silica-based refractory material. The packing 162 may fill the entire hole 127, but more preferably, the packing 162 is installed to contact the lower surface of the brick layer 126. Therefore, the packing 162 includes a packing body 164 which is inserted into the hole 127 and allows the heater 130 to be installed therethrough, and a flange 166 protruding from the packing body 164 to contact the lower surface of the brick layer 126 of the loop block 120.

According to a method for manufacturing a float glass according to an exemplary embodiment, the apparatus 100 for manufacturing a float glass according to the above embodiments is used to manufacture a glass with a forming temperature of 600 to 1,300° C. by a float process. In other words, molten glass G has a lower viscosity than molten metal M, and the weight of the molten glass G is about ⅔ of that of the molten metal M. The molten glass G is continuously supplied into the apparatus 100 through the inlet 3 of the float chamber and then advances to the downstream side of the float chamber 106 while floating and spreading on the molten metal M. In this process, the molten glass G reaches an equivalent thickness according to its surface tension and the gravity so that a glass strip or ribbon GR which is solidified to some extent is formed. The glass ribbon GR is drawn by lift-out rollers (not shown) adjacent to the outlet 104 of the float chamber 106 and is pulled toward an annealing lehr (not shown). In addition, the thickness of the produced glass ribbon GR may be changed according to the amount of molten glass G put through the inlet 102 or the pulling speed determined by a rotating speed of the lift-rollers or when forming means such as the top-rollers 140 installed in the float chamber 106 is controlled or changed. Therefore, the apparatus 100 for manufacturing a float glass according to this embodiment may perform a circulating process endlessly and operate on a permanent basis. In fact, the apparatus 100 according to this embodiment may manufacture a float glass without cessation for substantially several years. Here, the drawing speed of the glass ribbon G would be generally 1 to 200 ton/day.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An apparatus for manufacturing a float glass, comprising:
   a bottom block in which molten metal is stored and floats;
   a loop block positioned above and covering the bottom block;
   side seals disposed between the loop block and the bottom block;
   wherein the bottom block, the loop block, and the side seals define a float chamber, and
   wherein the loop block has at least one hole formed therethrough and a lower surface facing the float chamber;
   a heater installed through the at least one loop block hole; and
   a fragment intercepting member installed within the at least one loop block hole for preventing fragments generated at the loop block from falling onto the bottom block through the at least one loop block hole;
   wherein the fragment intercepting member includes a packing body of refractory material surrounding the heater and contacting both the heater and a surface of the loop block exposed on an inner wall of the hole
   and a flange protruding from the packing body so as to contact the lower surface of the loop block.

2. The apparatus for manufacturing a float glass according to claim 1, wherein the refractory material is an alumina-based or silica-based material.

3. A method for manufacturing a float glass, comprising:
   continuously supplying molten glass onto the molten metal from an inlet of a float chamber of the apparatus for manufacturing a float glass according to claim 1;
   forming the molten glass into a glass ribbon on the molten metal; and
   continuously drawing the glass ribbon from an outlet of the float chamber.

* * * * *